United States Patent [19]
Hebert

[11] B 3,924,443
[45] Dec. 9, 1975

[54] SCALE TESTER

[76] Inventor: Arthur J. Hebert, 45-45th Ave., Edmundston, New Brunswick, Canada

[22] Filed: Sept. 27, 1973

[21] Appl. No.: 401,133

[44] Published under the Trial Voluntary Protest Program on January 28, 1975 as document no. B 401,133.

[52] U.S. Cl. ................................ 73/1 B; 177/50
[51] Int. Cl.² ................................ G01L 25/00
[58] Field of Search ......... 73/1 B, 1 C, 1 R; 177/50, 177/124, 246, 250, 261

[56] References Cited
UNITED STATES PATENTS
1,118,981  12/1914  Wenzelmann ........................ 73/1 B Primary Examiner—Donald O. Woodiel
Assistant Examiner—John S. Appleman
Attorney, Agent, or Firm—Martin J. Marcus

[57] ABSTRACT

A platform scale is provided with a scale testing mechanism for determining the accuracy of the scale. The testing mechanism comprises a hanger fixed to the underside of the scale platform, a balance beam suspended from the hanger, a calibrated weight suspended from the balance beam and a fulcrum for the beam. An additional support is provided for the beam and the fulcrum is arranged to be movable so as to move the beam into supported engagement with one or the other of the hanger and the support.

8 Claims, 3 Drawing Figures

SCALE TESTER

The present invention relates to scale testing mechanisms and more particularly to mechanisms for determining the accuracy of platform scales.

DESCRIPTION OF THE PRIOR ART

In one type of previously known scale testing mechanisms, there is provided a base member supported on the upper side of a scale platform and acting as a fulcrum for a balance beam. The balance beam has one short arm pivotally connected to the ground or the scale base and a long arm from which a calibrated weight is suspended at any selected distance from the fulcrum. The arrangement is such that the force exerted on the scale platform is greater than the actual weight of the calibrated weight suspended from the balance beam. Such devices are portable and must be installed and removed after every use. The weights used are very small and the arm must therefore be very long. With this arrangement a very small movement of the platform results in a very large movement of the weight. The test results obtained with the use of such an apparatus are subject to the accuracy of the testing device itself and on the accuracy with which the weight can be positioned on the arm. One such testing device is disclosed in Canadian Pat. No. 149,732, issued Aug. 5, 1913 to Samuel M. Boling.

In another form of scale testing device, there is provided a balance scale having its base resting on the scale platform. An hydraulic cylinder is connected at opposite ends thereof to the scale base and to a beam of the balance scale to exert a downward force on the balance scale and, through its base, on the scale platform. With an arrangement of this nature, the test is essentially a comparison of the calibration of the platform scale with the calibration of the balance scale and therefore is highly dependent on the accuracy of the balance scale. As with the previously discussed device, this apparatus must be installed prior to, and removed immediately after, each test. One such testing device is disclosed in U.S. Pat. No. 1,746,351, issued Feb. 11, 1930 to A. O. Hem.

Also known in the prior art are devices known as dead-weight testers which are used to subject various devices to the effects of stationary weights to enable calibration of the devices. These testers generally comprise a plurality of superimposed calibrated weights and some mechanism for raising the weights either serially or as a unit. The weights rest on some support structure and are raised off the structure by engagement with the weights of a hanger which is itself supported either directly or indirectly on the device to be tested. The arrangement, therefore, is such that the device to be tested must be raised with the hangers when the hangers themselves raise to pick up the calibrated weights. Such an arrangement would be difficult, if not impossible, to use for testing a platform scale since the platforms thereof are not permitted to move to a great extent. A dead-weight tester of this type is disclosed in U.S. Pat. No. 2,925,728, issued Feb. 23, 1960 to D. H. MacDonald.

In a recent development, a permanently installed platform scale tester was developed wherein a calibrated weight is suspended from the platform in a testing position and a motor driven mechanism is provided for lifting the weight out of supported engagement with the platform. This tester, while providing excellent results, is of large size and weight because of the large size of the calibrated weight that must be used. If the size and weight of this tester could be reduced, the capital costs would also be reduced. This device is the subject of U.S. Pat. No. 3,738,439 issued June 12, 1973 to A. J. Hebert, the applicant of the present application.

The inclusion, in the last-mentioned device, of a simple balance arm to multiply the effect of the calibrated weight on the platform is not suitable since, with this arrangement, the reduction in the value of the calibrated weight is accompanied by a proportional increase in the necessary displacement of the weight. This would, of course, require an excessive amount of free space beneath the scale platform.

DEFINITION OF THE INVENTION

Accordingly, it is an object of the present invention to provide an improved tester for use with platform scales.

In accordance with the present invention, there is provided a scale having a platform, scale means connected to the platform for indicating the weight of an object supported by the platform, and a tester for the platform scale. The tester comprises a beam, a first supporting means for supporting the beam from the scale platform, a second supporting means mounted on a base of the tester, a fulcrum for the beam movable between two limiting positions to move the beam between supported engagement with the first supporting means and supported engagement with the second supporting means, a calibrated weight supported by the beam, and means for selectively moving the fulcrum between two limiting positions.

DESCRIPTION OF THE DRAWINGS

The present invention will now be described, by way of example, with reference to the accompanying drawings in which.

DESCRIPTION OF THE ILLUSTRATED EMBODIMENTS

Figure 1:
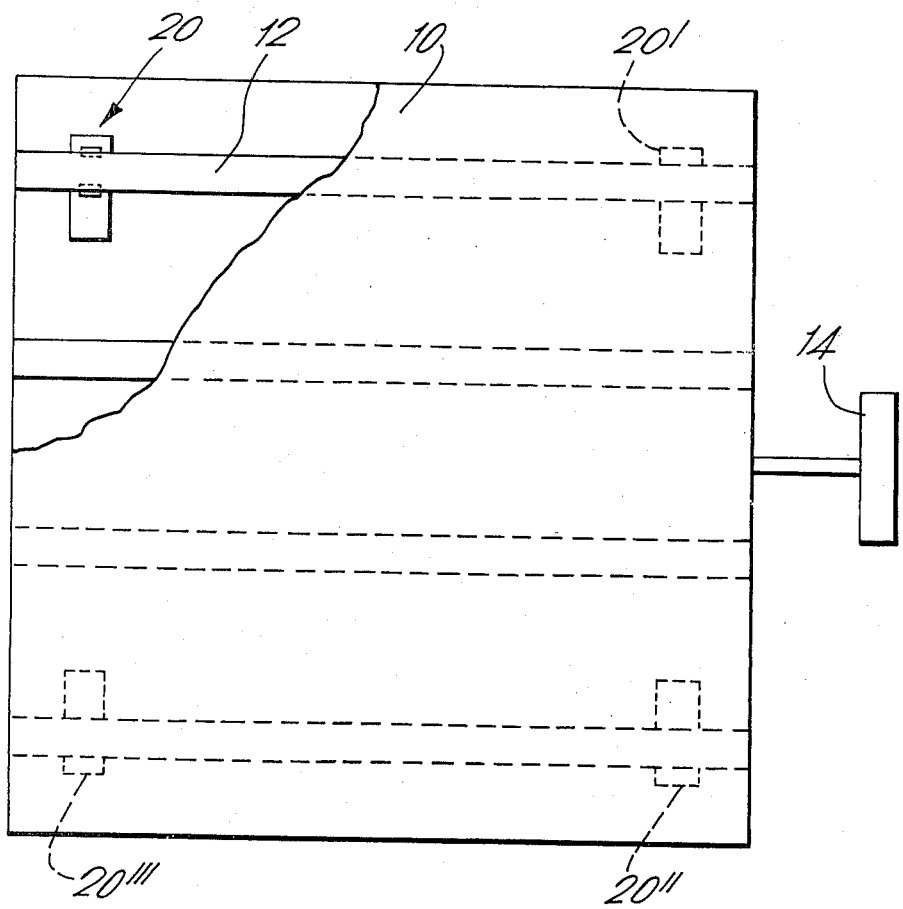
FIG. 1 is a schematic plan view of a platform scale including a scale testing mechanism in accordance with the present invention.

Referring most particularly to FIG. 1, there is shown a platform scale having a platform 10 supported on a plurality of beams, one of which is shown at 12, and a scale 14 connected by any known beam arrangement (not shown) to platform 10 to indicate the weight of any object placed thereon. In accordance with the objects of the present invention, there is provided, beneath the scale platform 10, a scale tester as indicated generally by the reference numeral 20. Also shown in FIG. 1 are a plurality of additional scale testers 20', 20" and 20'" which may be provided on the scale platform 10 at, for example, the corners thereof so as to ascertain the response of the scale to loads at various points on the platform.

A scale tester in accordance with the present invention will now be described with reference to FIGS. 2 and 3.

A support means consisting of a hanger 22 is rigidly connected to beam 12. Hanger 22 is adjustable and comprises a U-bolt 24 having two threaded arms 26. A lower clamping plate 28 extends between, and slidably engages with, arms 26 of the U-bolt 24 so as to be slidable therealong. Two upper clamping plates 30 are each slidably mounted on a respective one of the two U-bolt arms 26, and a pair of nuts 32 and 34 threaded onto each of arms 26 with clamping plates 28 and 30 between the two nuts.

Figure 2:
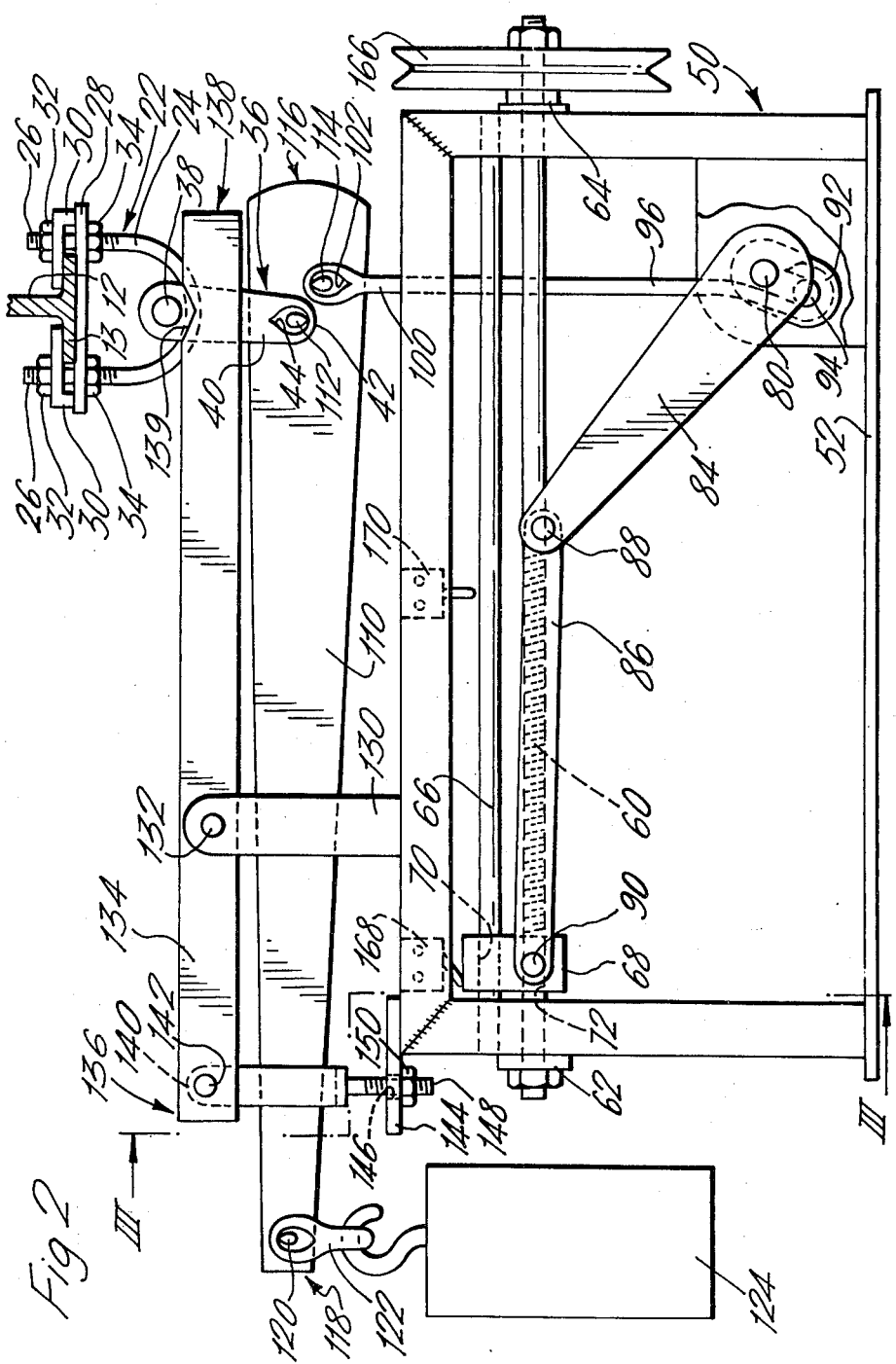
FIG. 2 is a front elevation of a scale tester in accordance with the present invention.

As shown in FIG. 2, the lower flange 13 of beam 12 is clamped between the upper clamping plates 30 and the lower clamping plate 28 by a force exerted by the nuts 32 and 34. This arrangement provides for vertical adjustment of the U-bolt 24 with respect to beam 12.

Associated with hanger 22 is a fulcrum part generally indicated by the reference numeral 36. Fulcrum part 36 consists of a horizontally extending bar 38 extending through the U-bolt 24 of hanger 22 for free vertical movement therewithin. A pair of arms 40 are fixed to bar 36 so as to project radially therefrom at axial positions spaced apart from one another and from the ends of the bar 38. The arms 40 have thickened free ends 42 and horizontally aligned apertures 44 through these thickened free ends for a purpose that will be hereinafter described.

Positioned beneath the arrangement thus far described is a frame 50 of substantially rectangular configuration and having a base 52 supported on the ground. As can be seen from the accompanying drawings, frame 50 is offset both longitudinally and laterally from a position centrally beneath the hanger 22.

A horizontally arranged jack screw 60 is journalled, at its opposite ends, to the opposite longitudinal ends of frame 50 by means of bearings 62 and 64. As can be seen from FIG. 3, jack screw 60 is laterally offset from a position directly beneath hanger 22. A guide rod 66 is parallel to and positioned directly above jack screw 60 and has its opposite ends secured to the frame 50.

A metal block 68 has two parallel through bores, a smooth bore 70 which is a sliding fit on guide rod 66, and an internally threaded bore 72 which is a mate to the threads of jack screw 60. Block 68 is thereby mounted on jack screw 60 and guide rod 66 for movement longitudinally of the frame 50 in response to rotation of the jack screw. This mechanism is arranged to drive a linkage consisting of a shaft 80 extending transversely of frame 50 and journalled thereto by bearings 82, a pair of transversely spaced apart radial arms 84 and a pair of transversely spaced apart connecting rods 86. Each arm 84 is pivotally connected to an end of a respective one of the connecting rods 86 by a pin joint 88 and the opposite ends of the connecting rods are pivotally connected to the opposite transverse sides of block 68 by pins 90. Thus, rotation of the jack screw 60 will slide block 68 along guide rod 66 and, through the connecting rods 86 and the arms 84, rotate shaft 80.

Figure 3:
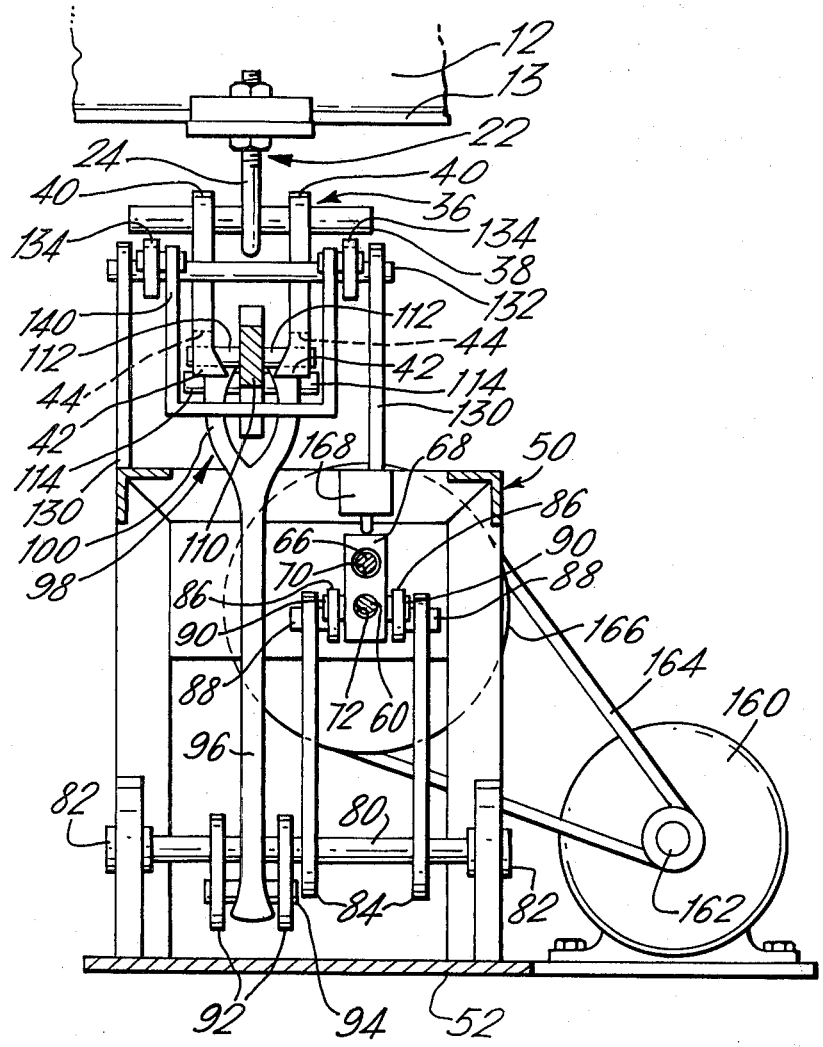
FIG. 3 is a side elevation of the scale tester taken along line III—III of FIG. 2.

Referring to FIG. 3, it will be seen that the arms 84 are positioned towards one end of shaft 80 and that another pair of transversely spaced apart arms 92, shorter than arms 84 and making an obtuse angle therewith, are mounted on shaft 80 towards the opposite axial end thereof. A short shaft 94 extends between arms 92 and is parallel to and spaced from shaft 80.

A link 96 has a lower end thereof journalled on the shaft 94 so that rotation of the shaft 80 will cause reciprocation of the link 96. The upper end 98 of link 96 is bifurcated to provide two arms 100 having horizontally aligned apertures 102 therein.

As can be seen from FIG. 3, the link 96 is vertically aligned with the above-discussed hanger 22.

A substantially horizontally disposed beam 110 extends between the arms 40 of fulcrum part 36 and between the arms 100 of link 96. The beam is supported in position by two pairs of lateral projections 112 and 114 which engage in the apertures 44 of fulcrum part 36 and 102 of link 96 respectively. These projections are shaped to provide a knife edge type engagement with the respective apertures. As can be seen most particularly from FIG. 2, the projections 112 and 114 are positioned adjacent an end 116 of beam 110 with the projections 114 that engage link 96 positioned intermediate projections 112 and end 116 of the beam. The opposite end 118 of beam 110 projects beyond the end of frame 50.

A further pair of lateral projections 120 are provided on beam 110 at the end 118 thereof. A clevis 122 is supported from these projections. Projections 120 may, like projections 112 and 114, be shaped to provide a knife edge type support for the clevis 122.

A calibrated weight 124 is suspended from the clevis 122.

Since the force exerted by the calibrated weight on beam 110 is exerted at a substantial distance further away from the fulcrum provided by projections 114 and link 96 than is the reaction force exerted through fulcrum part 36 and hanger 22 on the platform, the force on the platform will be considerably greater than the value of the calibrated weight. Given any particular geometry, the ratio of gravitational force on the calibrated weight to force applied to the platform can be determined with great accuracy.

In order that the testing mechanism can be completely disengaged from the platform during a normal use of the scale, there is provided a second support arrangement for the beam which cooperates with the movable fulcrum provided by link 96 to effect this disengagement.

Referring again to FIGS. 2 and 3, a pair of vertical arms 130 are mounted on frame 50 on opposite sides of the beam 110. A horizontal, transversely extending shaft 132 extends between these arms 130. A pair of levers 134 are journalled on shaft 132 between the arms 130 but on opposite sides of beam 110. The levers 134 have ends 136 positioned horizontally between the shaft 132 and the calibrated weight 124. A clevis 140 is pivotally connected to the ends 136 of levers 134 by respective pivots 142. As can be most readily seen from FIG. 3, the clevis 140 extends beneath beam 110.

The opposite ends 138 of levers 134 are extended so as to be positioned beneath bar 38 of fulcrum part 36 which, as previously discussed, project beyond the arms 40 of this part. A V-notch 139 is formed in the upper edge of each lever 134 directly beneath the bar 38.

A plate 144 is fixed to the end of frame 50 so as to project towards calibrated weight 124 and beneath clevis 140. An aperture 146 is provided in plate 144 centrally beneath clevis 140. A threaded rod 148 is secured to the bottom of clevis 140 so as to project downwardly therefrom, through aperture 146. A nut 150 is threaded onto rod 148 to thereby limit the movement of clevis 140 and thereby levers 134.

The tester as thus far described operates as follows:

The tester is shown in FIG. 2 in its testing position with the fulcrum provided by projections 114 and link 96 in its lowest position. The only other support for the beam comes from the scale platform 10 via hanger 22 and fulcrum part 36. The stop nut 150 is adjusted such that the levers 134 do not engage the bar 38 of fulcrum part 36. To move the tester into a non-testing position, the jack screw 60 is rotated to move block 68 to the right as seen in FIG. 2 so as to rotate shaft 80 in a clockwise direction and, through link 96, to raise the fulcrum provided by projections 114. As this fulcrum is raised, the beam will pivot counterclockwise about the projections 112 until it engages clevis 140. Further pivotal movement of the beam 110 will pivot levers 134 in a counter-clockwise direction to engage bar 38 of fulcrum part 36 in notches 139 and to raise bar 38 out of engagement with hangers 22. The beam will then be fully supported by the levers 134 and the link 96. Any further pivotal movement of the beam will be about shaft 132. Thus, the amount of displacement of the calibrated weight 124 will be smaller than the amount of displacement of the bar 38 of fulcrum part 36.

It is preferred that in the testing position the force exerted on the platform will be approximately 20 times the value of the calibrated weight 124. It will, of course, be necessary to take into consideration the force exerted by the auxiliary elements, e.g., beam 110 and clevis 122, in calculating this value.

The scale tester of the present invention is preferably electrically operated and to achieve this, a reversible electric motor 160 is mounted on base 52 of frame 50 and drives the jack screw 60 through a pulley wheel 162 mounted on the motor shaft, a drive belt 164 and a pulley wheel 166 mounted on the jack screw. To make the operation of the device fully automatic, a pair of limit switches 168 and 170 are mounted on the frame 50 for actuation by block 68 when in either of its limiting positions. These limit switches are in the electric circuits for the motor so as to automatically stop motor 160 when the tester has reached either its testing position or its non-testing position.

While a preferred embodiment of the present invention has been described herein, it will be apparent that alternative arrangements could well be provided. For example, the fulcrum part 36 and the levers 134 could be elmininated by providing an arrangement wherein the lateral projections 112 of beam 110 engage a hanger such as hanger 22 directly. In such an embodiment an additional support for the beam 110 in its non-testing position would be mounted on frame 50.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. Apparatus for testing scales of the type which includes a platform and a weight indicating means connected to said platform which is responsive to a weight supported by said platform, said testing apparatus comprising:
   a. a first support means having means thereon connecting the same to said platform;
   b. a beam supported by said first support means in a testing position;
   c. a base;
   d. fulcrum means pivotally connecting said beam to said base at a position along the beam to one side of said first support means;
   e. a calibrated weight supported by said beam at a position along said beam to the other side of said first support means;
   f. a second support means on said base extending at least in part beneath said beam at a position intermediate said first support means and said calibrated weight; and
   g. means for selectively moving said fulcrum means upwardly and downwardly with respect to said base and said platform thereby to move said beam between said testing position wherein it is supported by said first support means and said fulcrum means and a non-testing position wherein it is supported by said second support means and said fulcrum means.

2. Apparatus as defined in claim 1, further comprising second fulcrum means suspended from said first support means and from which said beam is suspended in said testing position, and means for moving said second fulcrum means out of its suspended relation with said first support means when said beam is moved from said testing position to said non-testing position.

3. Apparatus as defined in claim 2, wherein said second support means and said means for moving said second fulcrum means comprise lever means pivotally connected to said base for engagement with said beam on one side of said pivotal connection to said base and for engagement with said second fulcrum means on the other side of said pivotal connection to said base.

4. Apparatus as defined in claim 1 wherein said fulcrum means comprise a link fulcrumed to said beam at one end thereof and said means for moving said fulcrum means comprise means coupled to the opposite end of said link.

5. Apparatus as defined in claim 4 wherein said means for moving the fulcrum means include a shaft mounted on said base, a crank on said shaft to which said opposite end of said link is journalled and means for rotating the shaft.

6. Apparatus as defined in claim 5 wherein said means for rotating the shaft include a jack screw mounted on said base and a linkage interconnecting the jack screw and the shaft.

7. Apparatus as defined in claim 6 wherein said means for rotating the shaft further include motor means coupled to said jack screw for rotating the same.

8. Apparatus as defined in claim 7 wherein said motor means comprise an electric motor and said apparatus further includes a pair of limit switches mounted on said base, each operative to shut off said electric motor when actuated, and means on said linkage for actuating the limit switches in respective ones of said testing and non-testing positions.

* * * * *